United States Patent [19]
Dezaki et al.

[11] Patent Number: 5,521,638
[45] Date of Patent: May 28, 1996

[54] VIDEO CAMERA WITH RECORD SHUTOFF MECHANISM

[75] Inventors: Yoshito Dezaki, Hirakata; Mitsuhiro Magari, Moriguchi; Atsushi Fujioka, Hirakata, all of Japan

[73] Assignee: Matsushita Electric Industrial Co., Ltd., Osaka, Japan

[21] Appl. No.: 321,567

[22] Filed: Oct. 14, 1994

[30] Foreign Application Priority Data

Oct. 15, 1993 [JP] Japan .................................. 5-258142
Sep. 30, 1994 [JP] Japan .................................. 6-236723

[51] Int. Cl.⁶ .................................................. H04N 5/225
[52] U.S. Cl. ............................................ 348/208; 358/906
[58] Field of Search ................................. 348/208, 333, 348/231; 358/906, 320

[56] References Cited

U.S. PATENT DOCUMENTS

| | | | |
|---|---|---|---|
| 4,480,278 | 10/1984 | Maeda | 360/73 |
| 4,531,164 | 6/1985 | Maeda et al. | 360/33.1 |
| 4,573,087 | 2/1986 | Tezuka et al. | 358/906 X |
| 4,675,747 | 6/1987 | Hanma et al. | 358/906 X |
| 5,099,364 | 3/1992 | Kawabata | 360/33.1 |
| 5,235,427 | 8/1993 | Kim | 348/208 |
| 5,313,305 | 5/1994 | Harigaya | 348/333 X |

FOREIGN PATENT DOCUMENTS

| | | |
|---|---|---|
| 4135643 | 5/1992 | Germany . |
| 2-87875 | 3/1990 | Japan . |
| 3-274969 | 12/1991 | Japan . |

OTHER PUBLICATIONS

Patent Abstracts of Japan, vol. 16, No. 316 (E–1231) 10 Jul. 1992.
Patent Abstracts of Japan, vol. 16, No. 95 (E–1175) 09 Mar. 1992.
Patent Abstracts of Japan, vol. 14, No. 278 (E–941) 15 Jun. 1990.

*Primary Examiner*—Wendy R. Greening
*Attorney, Agent, or Firm*—Wenderoth, Lind & Ponack

[57] ABSTRACT

A video camera includes a viewfinder through which an operator may view an image of an object to be videoed, a rotatably supported head-carrier cylinder and a capstan for transporting a length of magnetic recording medium. This video camera also includes at least one of first and second detecting units for detecting a change in rotation of the rotary head-carrier cylinder and for detecting a change in rotation of the capstan, respectively, and a determining unit operable to determine, in reference to information supplied from at least one of the first and second detecting units, whether or not a video recording then taking place is in accordance with the will of an operator. The video camera may be provided with at least one of a camera wobbling detector and an eye sensor for detecting whether or not the operator looks through the viewfinder and, in such case, the determining unit makes the determination in reference to information supplied from one of the camera wobbling detector and the eye sensor and that from at least one of the first and second detecting units.

16 Claims, 12 Drawing Sheets

VIDEO CAMERA WITH RECORD SHUTOFF MECHANISM

BACKGROUND OF THE INVENTION

1. Field of the Invention

The present invention generally relates to a video camera operable with either a VHS magnetic recording tape or a 8 mm magnetic recording tape and, more particularly, to the video camera equipped with means for disabling an uncalled-for recording in the event that a video camera continues video recording against the will of an operator such as when the operator inadvertently fails to switch the video camera off.

For the purpose of the present invention, the means for disabling an uncalled-for recording in the event that video camera continues video recording against the will of an operator will be referred to as a "record shutoff mechanism".

2. Description of the Prior Art

Video cameras equipped with a record shutoff mechanism, i.e., means for disabling an uncalled-for recording in the event that the video camera continues video recording against the will of an operator, are well known and prior art examples of record shutoff mechanisms are disclosed in, for example, the Japanese Laid-open Patent Publications No. 2-87875 and No. 3-274969.

The record shutoff mechanism disclosed in the Japanese Laid-open Patent Publication No. 2-87875 comprises a detector means for detecting a change of a portion or the whole of the viewed image of an object being videoed, a determining means operable in response to information provided by the detecting means to determine whether or not the viewed image has actually changed within the framework of a viewfinder screen and then to provide an output only when it has determined the viewed image having been changed, and a disabling means operable in response to the output from the determining means to disable a video recording operation of the video camera.

The record shutoff mechanism disclosed in the Japanese Laid-open Patent Publication No. 3-274969 includes either one of a photoelectric sensor or a touch-sensor installed at an eyepiece area of the viewfinder. In one embodiment where the photoelectric sensor is employed, the photoelectric sensor is utilized to determine whether or not an operator of the video camera is viewing the image cast on the viewfinder screen with his or her eye close towards the eyepiece and then to provide an output necessary to disable the operation of the video camera when the photoelectric sensor determines that the operator's eye is substantially distant from the eyepiece of the viewfinder. In the different embodiment where the touch-sensor is employed, the touch-sensor is utilized to determine whether or not an operator of the video camera is viewing the image cast on the viewfinder screen with his or her eye held in contact with an eyepiece area of the viewfinder and then to provide an output necessary to disable the operation of the video camera when the touch-sensor determines that the operator's eye is substantially distant from the eyepiece of the viewfinder.

Video cameras currently available in the market have, in addition to a power control switch, a REC (RECORD) button which is generally in the form of a toggle button capable of selectively assuming one of two different positions, a REC position to initiate a video recording and a STOP position to halt the video recording, for ease of camera handling. More specifically, commercially available video cameras are such that, when the power control switch is turned on, the video camera is held at a STAND-BY position in readiness for actual video recording which subsequently takes place upon manipulation (either slide or push) of the REC button to assume the REC position. In some of the video cameras, the STAND-BY position means that a length of magnetic recording tape is turned around a head-carrier cylinder so that the video recording can be quickly initiated immediately after manipulation of the REC button to assume the REC position. The video recording can be terminated when the REC button is again manipulated, but to assume the STOP position.

With those types of video cameras, it is not unusual that the operator fails to move the REC button to the STOP position and allows the video camera to continue its recording operation without realizing that the REC button in the REC position has not yet been moved to the STOP position. This uncalled-for video recording results in an unnecessary take-up of a substantial length of magnetic recording tape with no significant image recorded thereon and an unnecessary waste of the very limited battery power and it often occurs that, next time the operator intends to make a video recording, the video camera will no longer work because no more tape is available and/or because of a shortage of battery power.

In view of the generalities of the video cameras as discussed above, the record shutoff mechanism such as disclosed in the Japanese publications referred to above appears to be a convenient instrument. However, the record shutoff mechanism disclosed in the No. 2-87875 publication has been found having a problem in that, particularly where still-frame video images are being taken in succession with the video camera installed on a tripod, the record shutoff mechanism will work in response to the change of the viewed image to halt the recording operation against the will of an operator. Another problem associated with this known record shutoff mechanism is that, if the operator hailing to move the REC button to the STOP position walks around with the video camera hung from the shoulder, the video camera is correspondingly shaken to such an extent as to result in a considerable change of an image signal for one field or one frame, thereby fooling the record shutoff mechanism, that is, rendering the record shutoff mechanism to be ineffective to stop the video recording.

On the other hand, even the record shutoff mechanism disclosed in the No. 3-274969 publication has problems in that, in the event that the operator remove his or her eye away from the eyepiece area of the viewfinder for visual inspection of the object being videoed or for any other reason, the record shutoff mechanism immediately works to stop the video recording against the operator's will and in that, since the record shutoff mechanism works immediately after the operator removes his or her eye away from the viewfinder, a high-angle video recording with the video camera held overhead is impossible.

SUMMARY OF THE INVENTION

Accordingly, the present invention has been devised to substantially eliminate the above discussed problems and inconveniences inherent in the prior art video cameras equipped with a record shutoff mechanism and is intended to provide a video camera equipped with an improved and reliable record shutoff mechanism of a type which allows the video recording to continue when so desired by an operator, but to halt recording when an uncalled-for video recording is likely to occur.

To this end, according to one aspect of the present invention, there is provided a video camera which comprises a detecting means for detecting a change in rotation of a speed-controlled rotary element of the video camera, and a determining means operable in response to information supplied from the detecting means to determine whether or not a video recording then taking place is in accordance with the will of an operator.

The speed-controlled rotary element of the video camera referred to above may be either a rotary head-carrier cylinder and a capstan used to drivingly transport a length of magnetic recording medium.

According to another aspect of the present invention, there is provided a video camera which comprises a first detecting means for detecting a change in rotation of a rotary head-carrier cylinder, a second detector unit for detecting a change in rotation of a capstan used to drivingly transport a length of magnetic recording medium, and a determining means operable in response to information supplied from at least one of the first and second detecting means to determine whether or not a video recording then taking place is in accordance with the will of an operator.

According to the present invention, when surge information indicative of a considerable change in rotation of at least one of the cylinder or the capstan is provided from the detecting means while the REC button is held at the REC position, the determining means determines that the uncalled-for video recording is taking place and, therefore, the uncalled-for video recording is immediately halted automatically. In cases other than such surge case in which the information is provided, the determining means determines that the video recording is taking place as intended by the operator and, in such case, the video recording is allowed to continue.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
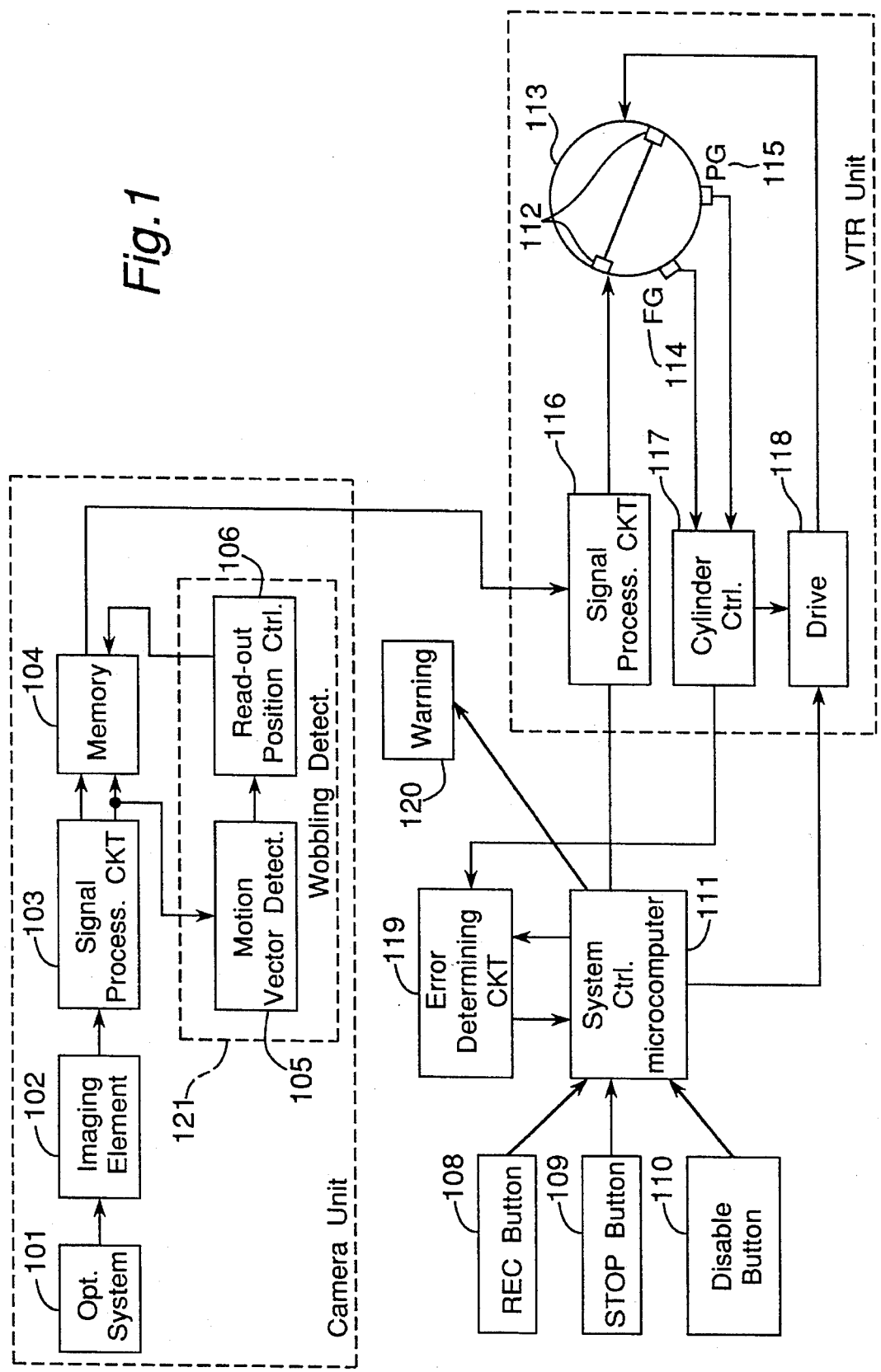
FIG. 1 is a block diagram showing an important portion of a video camera according to a first preferred embodiment of the present invention.
Figure 2:
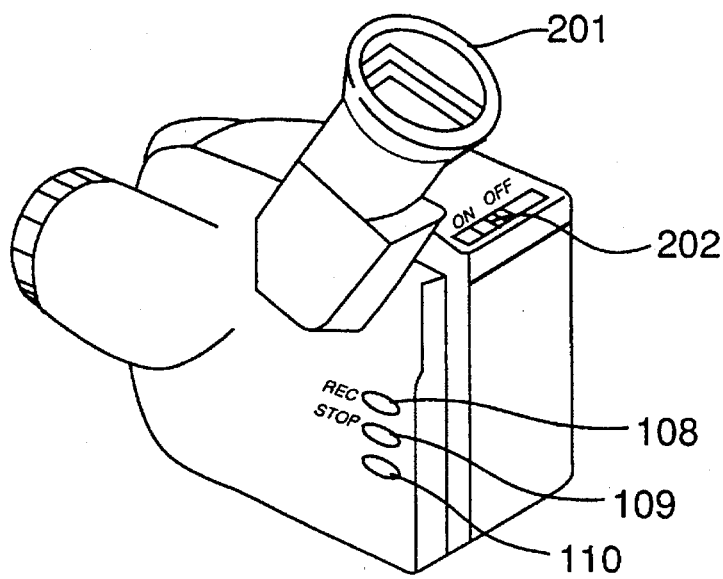
FIG. 2 is a schematic perspective view of the video camera.

Referring first to FIGS. 1 and 2, a video camera shown therein comprises an optical system including various lens elements for directing rays of light, reflected from an object to be videoed, towards an imaging element 102 which converts the incoming light into an electric signal proportional to the intensity of the reflected light received thereby, a viewfinder 201 through which an operator of the video camera aims at the object to be videoed and a main power switch 202 capable of assuming one of ON and OFF positions. The video camera also comprises a REC button 108 which, when activated, initiates supply of an electric signal necessary to initiate a video recording, that is, a recording of images on a length of magnetic recording tape (not shown), a STOP button 109 which, when activated, initiates supply of an electric signal necessary to stop the video recording, and a shutoff disable button 110 for disabling a record shutoff mechanism which will be described subsequently. All of the REC button 108, the STOP button 109 and the disable button 110 are electrically connected with a system control microcomputer 111 built in the video camera for controlling a camera unit and a VTR (video tape recorder) unit. It is to be noted that, although the video camera is shown to have the separate REC and STOP buttons, it may have a toggle REC button capable of assuming one of the REC and STOP positions as discussed in connection with the prior art.

As best shown in FIG. 1, the camera unit of the video camera includes, in addition to the optical system 101 and the imaging element 102, a camera signal processing circuit 103 for converting the electric signal from the imaging element 102 into luminance and color signals which are subsequently stored in a memory 104, a motion vector detector 105 as will be described later, and a read-out position control 106 operable to calculate the position from which an image stored in the memory 104 is to be read out in reference to a motion vector of the image viewed within the framework of the viewfinder 201.

The motion vector detector 105 referred to above is operable to divide the luminance signal from the signal processing circuit 103 into a plurality of areas, to calculate a motion vector of the image in each of these divided areas, to determine the validity of the motion vector in each of these divided areas, to calculate a vector coefficient representative of the degree of dispersion of the motion vectors in reference to the motion vector and the validity thereof and finally to calculate the motion vector of the image based on these elements. In any event, this motion vector detector is well known in the art and is discussed in detail by K. Uomori et al. in "AUTOMATIC IMAGE STABILIZING SYSTEM BY FULL-DIGITAL SIGNAL PROCESSING", IEEE Transaction on Consumer Electron, Vol. 36, No. 3, August 1990, which is herein incorporated by reference. Alternatively, a motion vector detector disclosed in any one of U.S. Pat. No. 5,099,323 issued to Morimura et al. on Mar. 24, 1992, and the Japanese Laid-open Patent Publication No. 3-198488 may be employed therefor, both of which are also herein incorporated by reference.

It is to be noted that the motion vector detector 105 and the read-out position control 106 together constitute a camera wobbling detecting unit 121.

The VTR unit includes a plurality of, for example, two, magnetic recording and/or reproducing heads 112 carried by a rotary carrier cylinder 113 for rotation together therewith, a rotation sensor 114 in the form of a frequency generator for generating a frequency signal indicative of the frequency proportional to the number of revolutions of the head-carrier cylinder 113, and an angle sensor 115 in the form of a pulse generator for generating a switching pulse necessary to selectively switching one of the magnetic heads 115 into operation when each of the magnetic heads 115 being rotated together with the head-carrier cylinder 113 is brought to a predetermined angular position. The VTR unit also includes a VTR signal processing circuit 116 operable to convert a video signal, read out from the memory 104 under the control of the read-out position control 106, into luminance and color signals to form an image signal to be subsequently recorded on the length of magnetic recording tape, and a cylinder control 117 for detecting a deviation in both speed and phase of the head-carrier cylinder 113 in reference to the frequency signal and the switching pulse supplied respectively from the frequency generator 114 and the pulse generator 115 and then to output control information, necessary to permit the head-carrier cylinder 113 to undergo the normal rotation, to a drive circuit 118. The drive circuit 118 is operable to drive a drive motor (not shown) for driving the head-carrier cylinder 113 at the prescribed speed in reference to the control information supplied from the cylinder control 117.

The record shutoff mechanism includes an error determining circuit 119 operable in reference to information supplied from the cylinder control 117 and indicative of the deviation in speed of rotation of the head-carrier cylinder 113 to determine whether or not a video recording then taking place is called for by an operator of the video camera, and a warning means 120 operable to provide the operator with an indication of an erroneous video recording taking place.

The video camera further comprises a sound recording and reproducing system of any known circuit configuration which is herein neither discussed nor shown for the sake of brevity since it does not constitute subject matter of the present invention.

Hereinafter, the operation of each of the camera unit, the VTR unit and the system control microcomputer 111 will be described.

Camera Unit

Rays of light carrying an image of the object to be videoed and having passed through the optical system 101 are converted by the imaging element 102 into an electric signal which is subsequently converted by the camera signal processing circuit 103 into luminance and color signals. The luminance and color signals outputted from the signal processing circuit 103 are stored in the memory 104 for each field or frame. The luminance signal outputted from the signal processing circuit 103 is also supplied to the motion vector detector 105. In this motion vector detector 105, the luminance signal from the signal processing circuit 103 is divided into a plurality of areas; a motion vector of the image in each of these divided areas is calculated for each field or frame; the validity of the motion vector in each of these divided areas is then determined; a vector coefficient representative of the degree of dispersion of the motion vectors is calculated in reference to the motion vector and the validity thereof; and the motion vector of the image based on these elements is finally calculated.

As hereinbefore indicated, the motion vector detector 105 may be the one disclosed in the Japanese Laid-open Patent Publication No. 3-198488 to which, in the case where a portion of the viewed image of the object being videoed undergoes a motion and an error would likely occur in detecting the motion vector, an erroneous detection can be suppressed by controlling the magnitude of the motion vector outputted therefrom.

VTR Unit

Assuming that the signal processing circuit 116, the cylinder control 117 and the drive circuit 118 are started in response to the information generated from the system control microcomputer 111, the drive circuit 118 supply an electric signal to the head-carrier cylinder 113 to drive the latter. While the headcarrier cylinder 113 is so driven in one direction in any known manner, the frequency generator 114 and the pulse generator 115 output the frequency signal and the switching pulse, respectively. In this way, the frequency signal and the switching pulse altogether provide the drive circuit 118 and the error determining circuit 119 with information representative of a change in rotation of the head-carrier cylinder 113, which information is hereinafter referred to as "cylinder surge information". While the cylinder control 117 is so structured as shown in FIG. 3 and will be described later, the drive circuit 118, in response to the head surge information controls the head-carrier cylinder 113 to compensate for a change in rotation, thereby eliminating the change in rotation of the head-carrier cylinder 113.

On the other hand, the video signal outputted from the memory 104 is supplied to the VTR signal processing circuit 116 by which the video signal is separated into luminance and color signals which are subsequently supplied to the magnetic heads 112 to record them on the length of magnetic recording tape. Although the magnetic heads 112 are generally employed not only for information recording purpose, but also for information reproducing purpose as is well known to those skilled in the art and, therefore, the video camera is also provided with a signal processing system associated with the information reproduction, it will not be described herein since the information reproduction system is irrelevant to the subject matter of the present invention.

Figure 3:
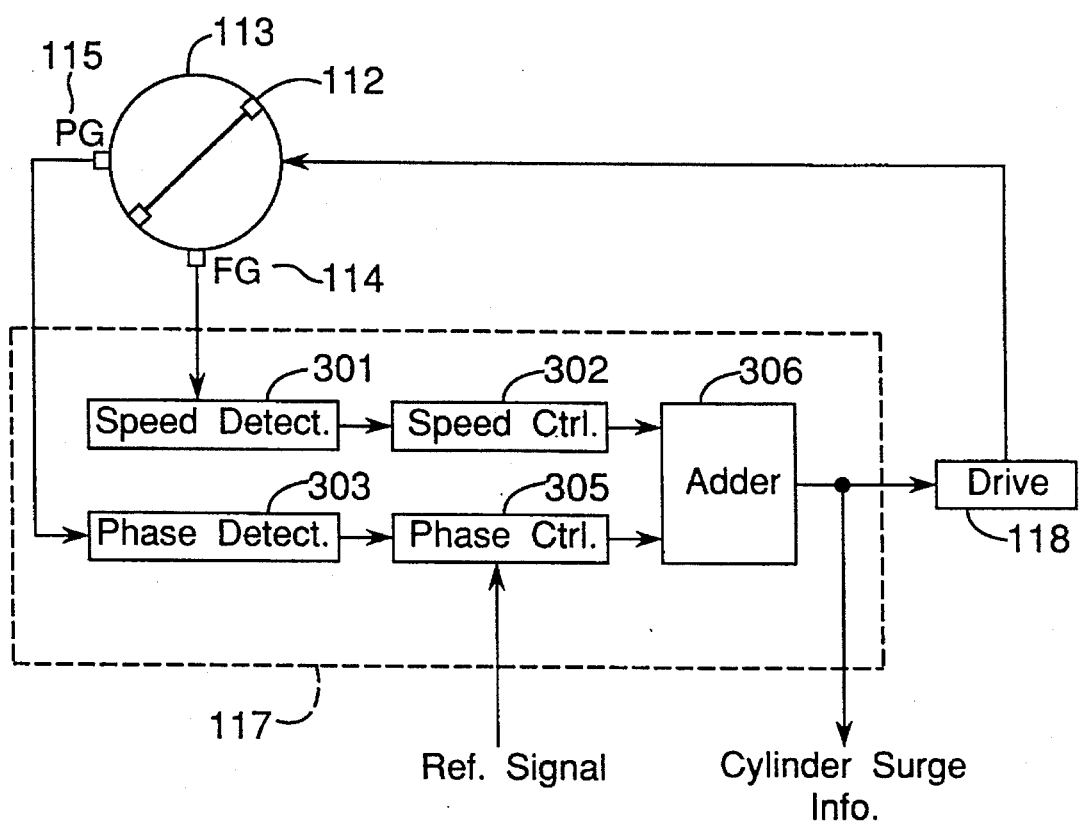
FIG. 3 is a block diagram showing a servo system for a rotary head-carrier cylinder employed in the video camera.

Referring to FIGS. 1 and 3 for discussion of the cylinder control 117, the cylinder control 117 includes a speed detecting circuit 301 for detecting the speed of rotation (the number of revolutions) of the head-carrier cylinder 113 in reference to the frequency signal supplied from the frequency generator or rotation sensor 114; a speed control circuit 302 operable in response to an output from the speed detecting circuit 301 to provide a speed control signal necessary to drive the head-carrier cylinder 113 at the prescribed speed; a phase detecting circuit 303 for detecting the phase of rotation of the head-carrier cylinder 113 in reference to the switching pulse supplied from the pulse generator or angle sensor 115; a phase control circuit 305 adapted to receive a phase signal from the phase detecting circuit 303 and a reference signal which consists of a servo signal and a sync signal defining reference for the video signal and to output a phase control signal necessary to drive the head-carrier cylinder 113 at a predetermined phase; and an adder circuit 306 for weighing both of the speed control signal from the speed control circuit 302 and the phase control signal from the phase control circuit 305 and summing the weighed speed and phase control signals together to provide the drive circuit 118 with the cylinder surge information.

During rotation of the head-carrier cylinder 113, the speed detecting circuit 301 analyzes the frequency signal from the frequency generator 114 to detect the speed of the head-carrier cylinder 113 and then outputs the speed signal to the speed control circuit 302. In response to the speed signal from the speed detecting circuit 301, the speed control circuit 302 outputs to the adder circuit 306 the speed control signal necessary to drive the head-carrier cylinder 113 at the predetermined speed. On the other hand, the phase detecting circuit 303 analyzes the switching pulse from the pulse generator 115 to detect the phase of rotation of the head-carrier cylinder 113 and then outputs the phase signal to the phase control circuit 305. Upon receipt of the phase signal from the phase detecting circuit 303 and the reference signal, the phase control circuit 305 outputs to the adder circuit 306 the phase control signal necessary to drive the head-carrier cylinder 113 at the predetermined phase. The adder circuit 306 performs a weighing of both of the speed control signal from the speed control circuit 302 and the phase control signal from the phase control circuit 305 and summing of the weighed speed and phase control signals together to provide a result of calculation performed thereby, that is, the cylinder surge information, which is then supplied to the drive circuit 118.

It is to be noted that the sync signal included in the reference signal is supplied to various circuit components of the video camera as is well known to those skilled in the art and, therefore, the supply of the sync signal to the various circuit components of the video camera will not be described in detail for the sake of brevity as it is irrelevant to the subject matter of the present invention.

System control microcomputer 111

The system control microcomputer 111 receives information representative of switching states of the REC button 108, the STOP button 109, the disable button 110 and other buttons and is, based on those pieces of information, operable to supply those pieces of information to the error determining circuit 119 for each field or frame and also to control the camera unit, the VTR unit and other mechanisms.

Error determining circuit 119

The operation of the error determining circuit 119 may be implemented by a software program executed by a microcomputer and, therefore, reference will be made to the flowchart shown in FIG. 4.

Figure 4:
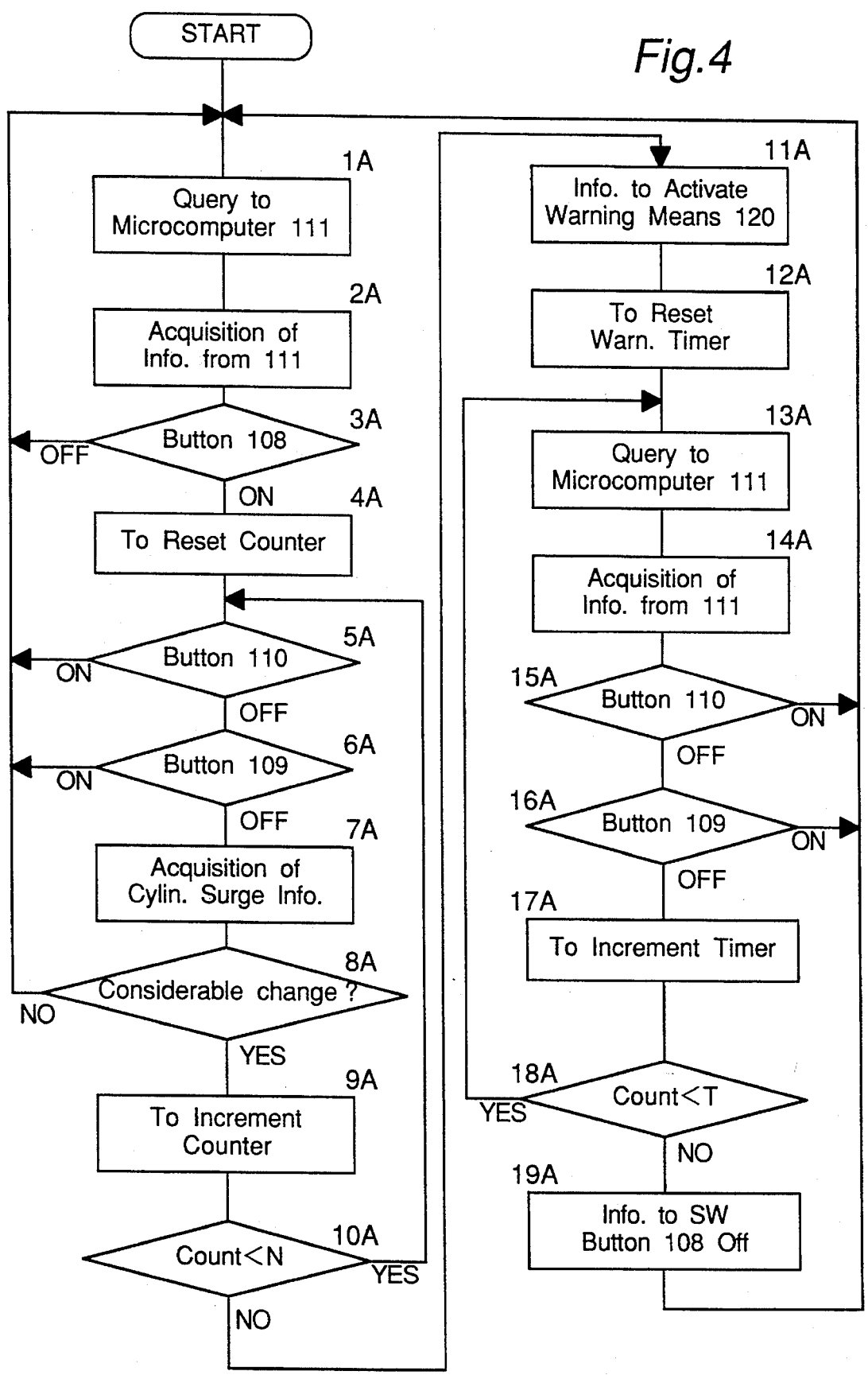
FIG. 4 is a flowchart showing the sequence of control performed by a record shutoff mechanism according to the first preferred embodiment of the present invention.

FIG. 4 illustrates the sequence of operation of the error determining circuit 119 executed by a microcomputer. Subsequent to start of the program flow, and at step 1A, query is made to the system control microcomputer 111 if the various buttons including the REC button 108 and so on are switched on. At subsequent step 2A, the microcomputer receives from the system control microcomputer 111 the information indicative of the respective switching states of the various buttons and stores the information in a memory, followed by step 3A at which a decision is made to determine the status of the REC button 108. Where step 3A determines that the REC button 108 has been switched off, the program flow goes back to step 1A, but where the step 3A determines that the REC button 108 has been switched on, the program flow goes to step 4A at which a determining counter which is a variable provided in the memory of the microcomputer is reset. The determining counter represents a variable indicative of how many fields or frames a video recording takes place. At step 5A subsequent to the resetting of the determining counter, a decision is made to determine the status of the disable button 110. Should step 5A determine that the disable button 110 has been switched on, indicating that the operator of the video camera has no intention to utilize the record shutoff mechanism, the program flow goes back to step 1A, but it goes to subsequent step 6A if the disable button 110 is found having been switched off.

At step 6A, a decision is made to determine the status of the STOP button 109. If the STOP button 109 is found having been switched on, indicating that the video recording is interrupted according to the will of the operator, the program flow goes back to step 1A. However, if the STOP button 109 is found having been switched off, the program flow goes to step 7A at which the microcomputer acquires the cylinder surge information from the cylinder control 117 and stores it in the memory. At subsequent step 8A, a decision is made to determine if the cylinder surge, that is, change in rotation of the head-carrier cylinder 113, is considerable. In the event that a result of decision at step 8A indicates NO indicating that the cylinder surge is not considerable, the program flow goes back to step 1A, but in the event of the contrary (YES indicating that the cylinder surge is considerable), the program flow goes to subsequent step 9A at which the determining counter is incremented by 1 (one) and then to step 10A at which a decision is made to determine whether the count of the determining counter is greater than a predetermined value N.

It is to be noted that the fact that the microcomputer has proceeded from the start to step 9A means that an erroneous recording or an uncalled-for video recording takes place at that field or frame and, therefore, at step 9A the determining counter is incremented by 1 as described above.

At decision step 10A, if the count of the determining counter is found to be smaller than the predetermined value N as indicated by YES, the program flow goes back to step 5A so that decision can be made to determine whether or not the erroneous recording takes place during the subsequent field or frame. On the other hand, if the count of the determining counter is found to be greater than the predetermined value N as indicated by NO, it means that the erroneous recording is taking place and, therefore, the program flow goes to step 11A at which information necessary to activate the warning means 120 is supplied to the system control microcomputer 111. Activation of the warning means 120 is represented by blinking of a light emitting diode (not shown) and/or display of a warning symbol within the framework of the viewfinder 201.

At step 12A, a warning timer which is a variable stored in the memory of the microcomputer is reset. The warning timer is a variable indicative of whether or not no response is made by the operator during a period corresponding to some fields or frames subsequent to activation of the warning means 120. At subsequent step 13A, query is made to the system control microcomputer 111 if the various buttons including the REC button 108 and so on are switched on. Then, at step 14A, the microcomputer receives from the system control microcomputer 111 the information indicative of the respective switching states of the various buttons and stores the information in a memory, followed by step 15A at which a decision is made to determine the status of the disable button 110. Where step 15A determines that the disable button 110 been switched on, indicating that the operator has no intention to utilize the record shutoff mechanism, the program flow goes back to step 1A, but where the step 15A determines that the disable button 110 has been switched off, the program flow goes to step 16A at which decision is made to determine the status of the STOP button 109.

If at step 16A the STOP button 109 is found having been switched on, indicating that the operator has intentionally interrupted the video recording, the program flow goes back to step 1A, but if the STOP button 109 is found having been switched off, the program flow goes to step 17A. It is to be noted that the fact that the microcomputer has proceeded from the start to step 17A means that no response was available from the operator of the video camera at that field or frame, and therefore, the count of the warning timer is incremented by 1 at step 17A.

At subsequent step 18A, a decision is made to determine whether or not the count of the warning timer is smaller than a predetermined value T. If the count of the warning timer is found to be greater than the predetermined value T as indicated by NO, indicating that the erroneous or uncalled-for recording is taking place, the program flow goes to step 19A, but if the count of the warning timer is found to be smaller than the predetermined value T as indicated by YES, the program flow goes back to sep 13A so that warning can be made after lapse of a time corresponding to the next succeeding field or frame period.

The fact that the microcomputer has proceeded to step 19A means that it has been determined that the erroneous or uncalled for video recording has taken place, and accordingly, at step 19A, information necessary to switch the REC button 108 off is supplied to the system control microcomputer 111 so that the video recording can be automatically shut off. Thereafter, the program flow returns to step 1A.

According to the program flow shown in and described with reference to FIG. 4, the occurrence of a condition in which rotation of the head-carrier cylinder 113 fluctuates for a substantial length of time represents the erroneous or uncalled-for video recording taking place. In general, a camera wobbling would little occur so long as the video recording takes place in accordance with the will of the operator and change in rotation of the head-carrier cylinder 113 is substantially little. On the other hand, if the operator walks around with the video camera hung from the shoulder while he or she has failed or forgot to switch the REC button 108 off, or under a condition in which the video camera is caused to undergo a considerable motion without the REC button 108 switched off, change in rotation of the head-carrier cylinder 113 is correspondingly considerable. Accordingly, by utilizing the cylinder surge information, it is possible to avoid the possibility of the erroneous or uncalled-for video recording taking place.

Figure 5:
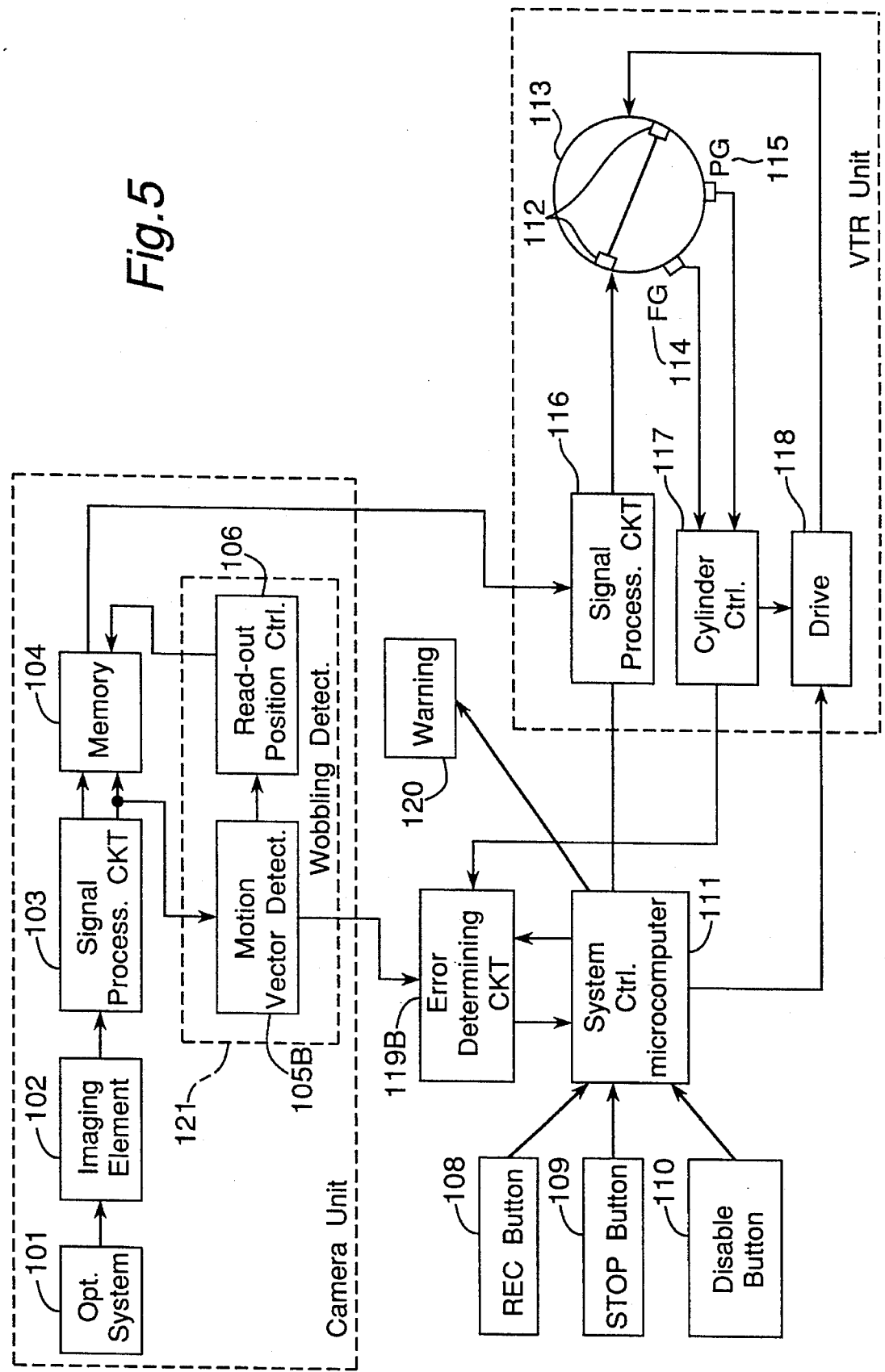
FIG. 5 is a block diagram showing an important portion of the video camera according to a second preferred embodiment of the present invention.

FIG. 5 illustrates the video camera according to a second preferred embodiment of the present invention. In FIG. 5, component parts of FIG. 5 similar to those shown in FIG. 1 are designated by like reference numerals and only the difference between the video camera of FIG. 1 and that of FIG. 5 will be discussed. In this embodiment of FIG. 5, briefly speaking, the motion vector detector 105 and the error determining circuit 119 both shown in FIG. 1 are substituted by a motion vector detector 105B and an error determining circuit 119B, respectively.

The motion vector detector 105B shown in FIG. 5 is operable to calculate a motion vector of the image in each of the divided areas for each field or frame period, to determine the validity of the motion vector in each of these divided areas, to calculate the degree of dispersion of the motion vectors in reference to the validities and finally to calculate the motion vector of the image based on these elements. Information indicative of the validities of the respective motion vectors in the divided areas and the vector coefficient representative of the degree of dispersion are outputted from the motion vector detector 105B to the error determining circuit 119B. This error determining circuit 119B shown in FIG. 5 is operable to determine whether or not the video recording then taking place is intentionally carried out by the operator, in reference to the cylinder surge information supplied from the cylinder control 117 and also to image wobbling information supplied from the motion vector detector 105B. While the motion vector detector 105B employed in the present invention may be of a structure disclosed in the Japanese Laid-open Patent Publication No. 3-198488 referred to hereinbefore, it is noted that the motion vector detector disclosed in the No. 3-198488 publication is used to determine the motion vector for the purpose of minimizing any possible influence brought on the videoed image by a camera wobbling whereas the motion vector detector 105B employed in the practice of the present invention makes use of "information indicative of whether or not the motion vector in each of the divided areas is valid (validity determining information)" and the "motion vector coefficient", both calculated in the motion vector detector of the No. 3-198488 publication, for the purpose of avoiding the erroneous or uncalled-for video recording.

The operation of the video camera shown in FIG. 5 will now be described with reference to the flowcharts of FIGS. 6 and 7. Subsequent to start of the program flow, and at step 1B, query is made to the system control microcomputer 111 if the various buttons including the REC button 108 and so on are switched on. At subsequent step 2B, the microcomputer receives from the system control microcomputer 111 the information indicative of the respective switching states of the various buttons and stores the information in a memory, followed by step 3B at which a decision is made to determine the status of the REC button 108. Where step 3B determines that the REC button 108 has been switched off, the program flow goes back to step 1B, but where the step 3B determines that the REC button 108 has been switched on, the program flow goes to step 4B at which a determining counter which is a variable provided in the memory of the microcomputer is reset. The determining counter represents a variable indicative of how many fields or frames a video recording takes place. At step 5B subsequent to the resetting of the determining counter, a decision is made to determine the status of the disable button 110. Should step 5B determine that the disable button 110 has been switched on, indicating that the operator of the video camera has no intention to utilize the record shutoff mechanism, the program flow goes back to step 1B, but it goes to subsequent step 6B if the disable button 110 is found having been switched off.

At step 6B, a decision is made to determine the status of the STOP button 109. If the STOP button 109 is found having been switched on, indicating that the video recording is interrupted according to the will of the operator, the program flow goes back to step 1B. However, if the STOP button 109 is found having been switched off, the program flow goes to step 7B at which the microcomputer acquires the cylinder surge information from the cylinder control 117 and stores it in the memory. At subsequent step 8B, a decision is made to determine if the cylinder surge, that is, change in rotation of the head-carrier cylinder 113, is considerable. In the event that a result of decision at step 8B indicates NO indicating that the cylinder surge is not considerable, the program flow goes back to step 1B, but in the event of the contrary (YES indicating that the cylinder surge is considerable), the program flow goes to subsequent step 9B at which the microcomputer acquires the information on the motion vector validity information and the information on the degree of dispersion both supplied from the motion vector detector 105B and store them in the memory.

At subsequent step 10B, a decision is made, based on the vector validity information, to determine if the motion vectors for all areas are not valid. In the event that the decision at step 10B indicates that the motion vector for at least portion of the areas is valid as indicated by NO, the program flow goes to subsequent decision step 11B, but in the event that the decision at step 10B indicates that the motion vector for all of the areas is not valid as indicated by YES, the program flow skips step 11B onto step 12B.

In general, little camera wobbling would occur so long as the video recording takes place in accordance with the will of the operator and change in rotation of the head-carrier cylinder 113 is substantially small. Under this condition, a vector detecting range is exceeded and, therefore, no valid motion vector is available. Because of this, the decision at step 10B corresponds to a determination of the magnitude of wobbling of the video camera. At step 11B, a decision is made to determine if the motion vector coefficient representative of the degree of dispersion is smaller than a predetermined value. If the decision at step 11B indicates that the motion vector coefficient is smaller than the predetermined value, the program flow goes back to step 1A as indicated by YES, but if it indicates that the motion vector coefficient is greater than the predetermined value as indicated by NO, the program flow goes to subsequent step 12B.

In general, little camera wobbling would occur so long as the video recording takes place in accordance with the will of the operator and change in rotation of the head-carrier cylinder 113 is substantially small. On the other hand, if the operator walks around with the video camera hung from the shoulder while he or she has failed or forgot to switch the REC button 108 off, the video camera is not only wobbled left and right or up and down, but also twisted. In such case, the motion vector coefficient increases to a value enough to make the determination at step 11B possible to execute. The fact that the microcomputer has proceeded from the start to step 12B means that the erroneous or uncalled-for video recording takes place at that field or frame, and therefore, the determining counter is incremented by 1 (one) at step 12B, followed by step 13B.

Then at step 13B, a decision is made to determine if the count of the determining counter is smaller than the predetermined value N. If the count of the determining counter is found to be smaller than the predetermined value N as indicated by YES, the program flow goes back to step 5B so that decision can be made to determine whether or not the erroneous recording takes place during the subsequent field or frame. On the other hand, if the count of the determining counter is found to be greater than the predetermined value N as indicated by NO, it means that the erroneous recording is taking place and, therefore, a warning subroutine shown in FIG. 7 is executed.

Figure 7:
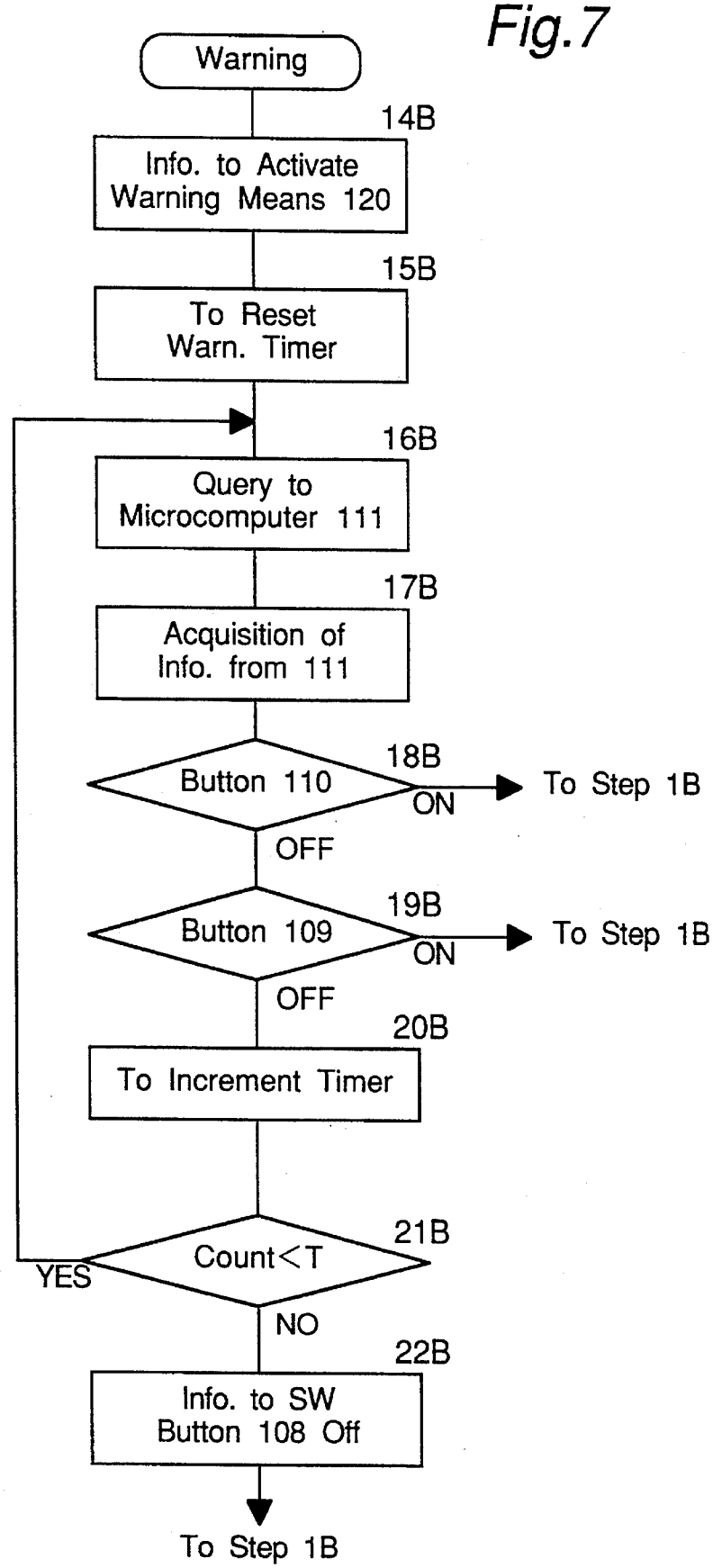
FIG. 7 is a flowchart which forms a part of the flowchart of FIG. 6, showing a warning subroutine.

Referring now to FIG. 7, at step 14B, the information necessary to activate the warning means 120 is supplied to the system control microcomputer 111. Activation of the warning means 120 is represented by blinking of a light emitting diode (not shown) and/or display of a warning symbol within the framework of the viewfinder 201. Then at step 15B, a warning timer which is a variable stored in the memory of the microcomputer is reset. The warning timer is a variable indicative of whether or not no response is made by the operator during a period corresponding to some fields or frames subsequent to activation of the warning means 120. At subsequent step 16B, query is made to the system control microcomputer 111 if the various buttons including the REC button 108 and so on are switched on. Then, at step 17B, the microcomputer receives from the system control microcomputer 111 the information indicative of the respective switching states of the various buttons and stores the information in a memory, followed by step 18B at which a decision is made to determine the status of the disable button 110. Where step 18B determines that the disable button 110 been switched on, indicating that the operator has no intention to utilize the record shutoff mechanism, the program flow goes back to step 1B, but where the step 18B determines that the disable button 110 has been switched off, the program flow goes to step 19B at which decision is made to determine the status of the STOP button 109.

If at step 19B the STOP button 109 is found having been switched on, indicating that the operator has intentionally interrupted the video recording, the program flow goes back to step 1B, but if the STOP button 109 is found having been switched off, the program flow goes to step 20B. It is to be noted that the fact that the microcomputer has proceeded from the start to step 20B means that no response was available from the operator of the video camera at that field or frame, and therefore, the count of the warning timer is incremented by 1 at step 20B.

At subsequent step 21B, a decision is made to determine whether or not the count of the warning timer is smaller than a predetermined value T. If the count of the warning timer is found to be greater than the predetermined value T as indicated by NO, indicating that the erroneous or uncalled-for recording is taking place, the program flow goes to step 22B, but if the count of the warning timer is found to be smaller than the predetermined value T as indicated by YES, the program flow goes back to sep 16B so that warning can be made after lapse of a time corresponding to the next succeeding field or frame period.

The fact that the microcomputer has proceeded to step 22B means that it has been determined that the erroneous or uncalled-for video recording has taken place, and accordingly, at step 22B, information necessary to switch the REC button 108 off is supplied to the system control microcomputer 111 so that the video recording can be automatically shut off. Thereafter, the program flow returns to step 1B.

Thus, according to the second preferred embodiment of the present invention, by the utilization of the information on the validity of the motion vectors and the motion vector coefficient representative of the degree of dispersion, in addition to the cylinder surge information, it is possible to accurately detect whether or the video camera is wobbled.

Figure 8:
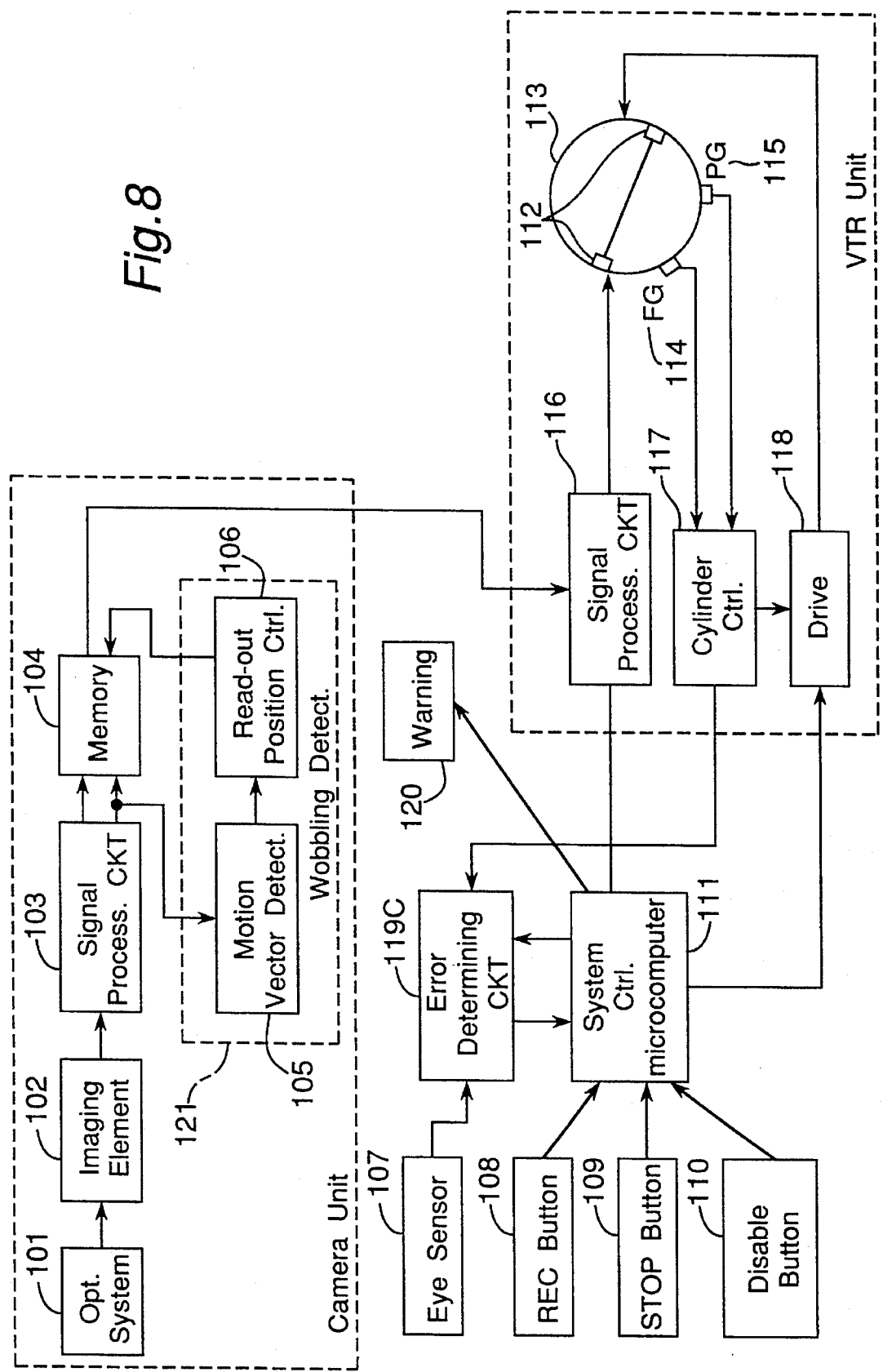
FIG. 8 is a block diagram showing an important portion of the video camera according to a third preferred embodiment of the present invention.

FIG. 8 illustrates the video camera according to a third preferred embodiment of the present invention. In FIG. 8, component parts of FIG. 8 similar to those shown in FIG. 1 are designated by like reference numerals and only the difference between the video camera of FIG. 1 and that of FIG. 8 will be discussed. In this embodiment of FIG. 8, briefly speaking, the video camera is additionally provided with an eye sensor 107 operable to detect whether or not the operator views through the viewfinder 201 and the error determining circuit 119 employed in the first embodiment of the present invention is replaced with an error determining circuit 119 of a type which utilizes an output signal from the eye sensor 107 and the cylinder surge information from the cylinder control 117 to determine if the video recording then taking place is intentionally carried out by the operator.

The operation of the video camera shown in FIG. 8 will now be described with reference to the flowcharts of FIGS. 9 and 10.

Figure 9:
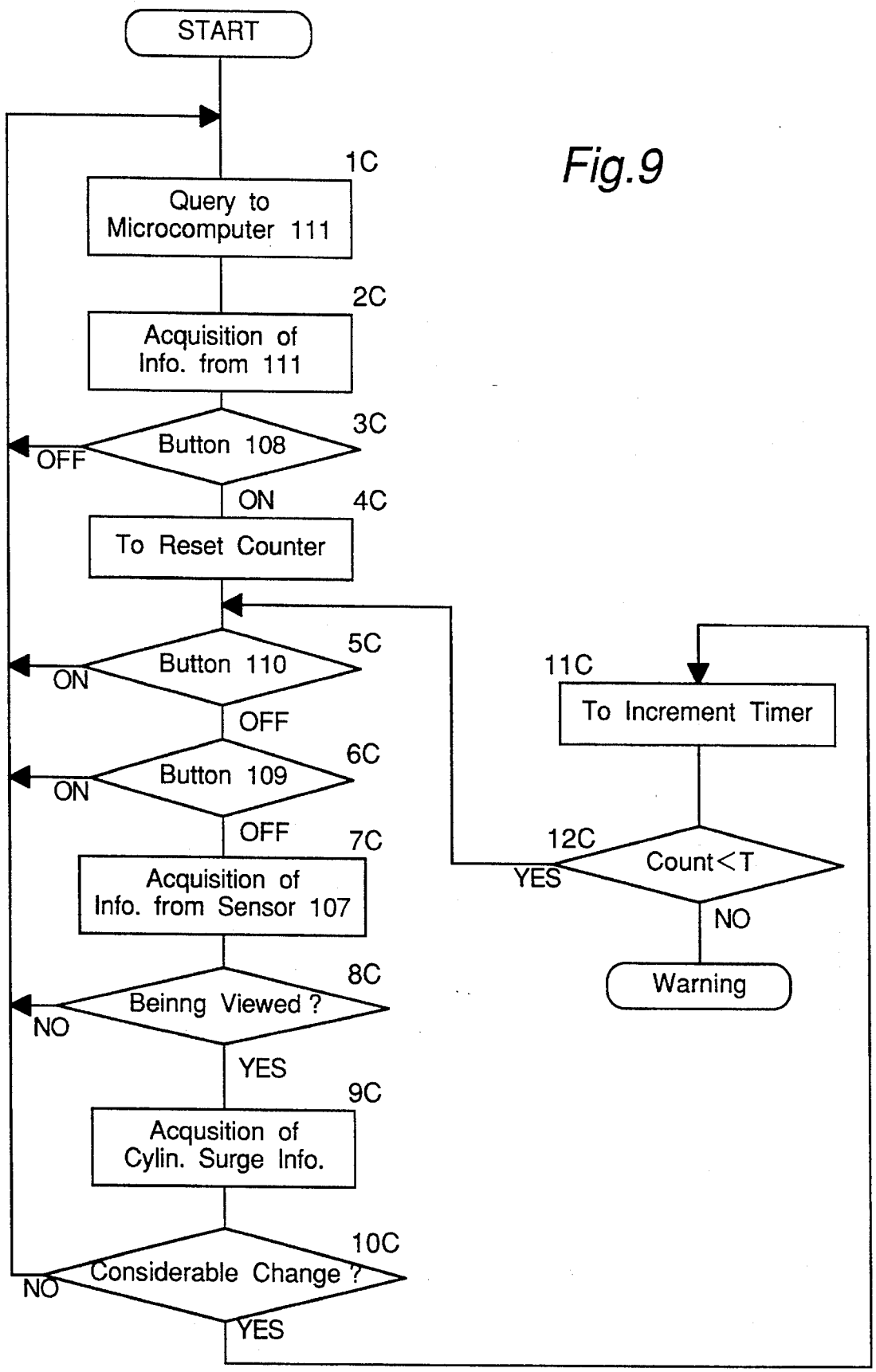
FIG. 9 is a flowchart showing the sequence of control performed by the record shutoff mechanism according to the third preferred embodiment of the present invention.

As shown in FIG. 9, subsequent to start of the program flow, and at step 1C, query is made to the system control microcomputer 111 if the various buttons including the REC button 108 and so on are switched on. At subsequent step 2C, the microcomputer receives from the system control microcomputer 111 the information indicative of the respective switching states of the various buttons and stores the information in a memory, followed by step 3C at which a decision is made to determine the status of the REC button 108. Where step 3C determines that the REC button 108 has been switched off, the program flow goes back to step 1C, but where the step 3C determines that the REC button 108 has been switched on, the program flow goes to step 4C at which a determining counter which is a variable provided in the memory of the microcomputer is reset. The determining counter represents a variable indicative of how many fields or frames a video recording takes place. At step 5C subsequent to the resetting of the determining counter, a decision is made to determine the status of the disable button 110. Should step 5C determine that the disable button 110 has been switched on, indicating that the operator of the video camera has no intention to utilize the record shutoff mechanism, the program flow goes back to step 1C, but it goes to subsequent step 6C if the disable button 110 is found having been switched off.

At step 6C, a decision is made to determine the status of the STOP button 109. If the STOP button 109 is found having been switched on, indicating that the video recording is interrupted according to the will of the operator, the program flow goes back to step 1C. However, if the STOP button 109 is found having been switched off, the program flow goes to step 7C at which the microcomputer acquires from the eye sensor 107, and then stores, eye sensor information indicative of whether the operator views through the viewfinder 201.

A decision of whether or not the operator views through the viewfinder 201 is made at subsequent step 8C. If the result of decision at step 8C indicates that the operator is looking at the image through the viewfinder 201 as indicated YES, this means that the operator wishes to continue the video recording and, therefore, the program flow goes back to step 1C. On the other hand if it indicates that the operator is not looking at the image through the viewfinder 201 as indicated by NO, the program flow goes to subsequent step 9C at which the microcomputer acquires the cylinder surge information from the cylinder control 117 and stores it in the memory. Then at step 10C, a decision is made to determine if the cylinder surge, that is, change in rotation of the head-carrier cylinder 113, is considerable. In the event that a result of decision at step 10C indicates NO indicating that the cylinder surge is not considerable, the program flow goes back to step 1C, but in the event of the contrary (YES indicating that the cylinder surge is considerable), the program flow goes to subsequent step 11C.

The fact that the microcomputer has proceeded from the start to step 11C means that the erroneous or uncalled-for video recording takes place at that field or frame, and therefore, the determining counter is incremented by 1 (one) at step 11C, followed by step 11C.

Then at step 12C, a decision is made to determine if the count of the determining counter is smaller than the predetermined value N. If the count of the determining counter is found to be smaller than the predetermined value N as indicated by YES, the program flow goes back to step 5C so that decision can be made to determine whether or not the erroneous recording takes place during the subsequent field or frame. On the other hand, if the count of the determining counter is found to be greater than the predetermined value N as indicated by NO, it means that the erroneous recording is taking place and, therefore, a warning subroutine shown in FIG. 10 is executed.

Figure 10:
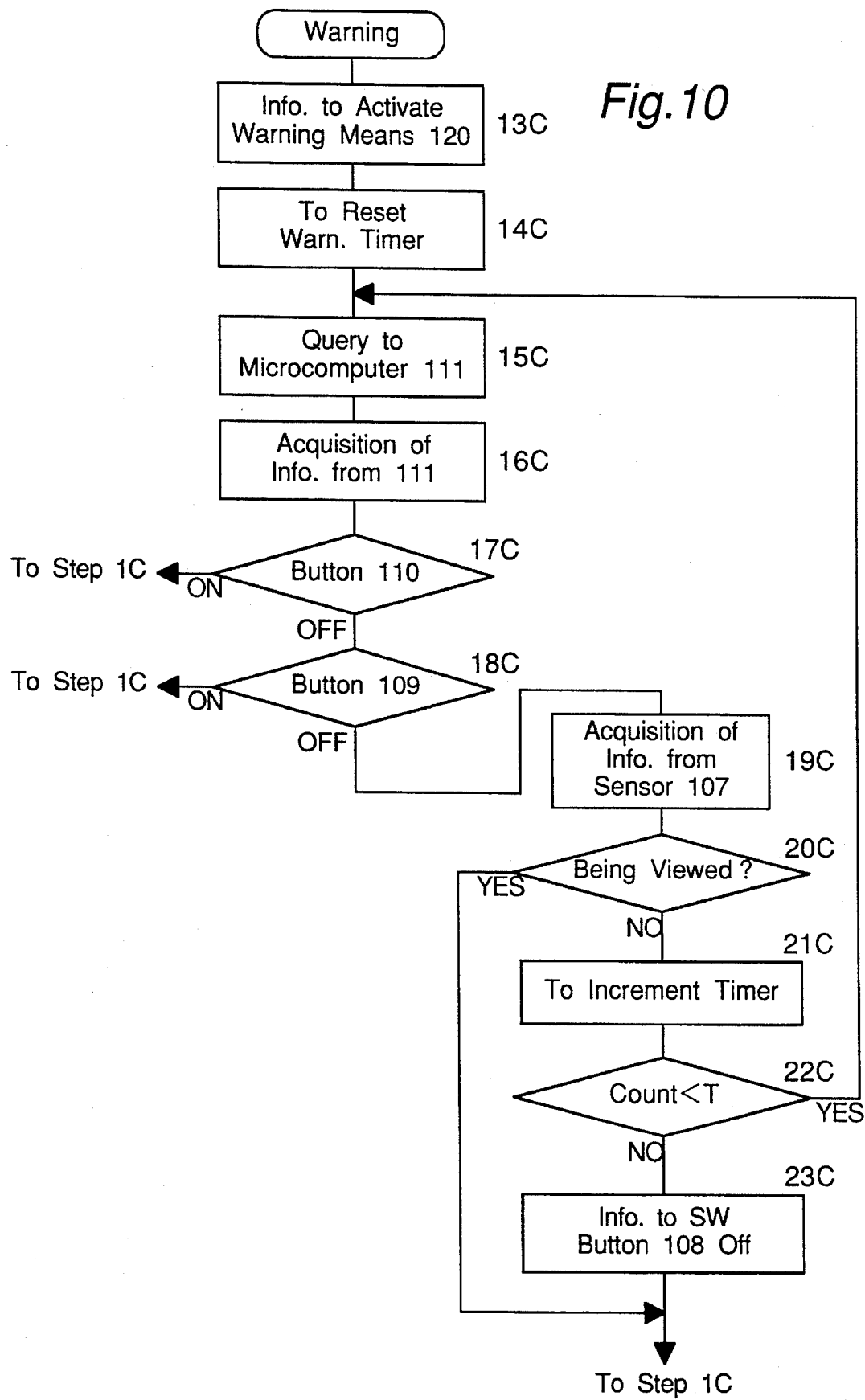
FIG. 10 is a flowchart which is a part of the flowchart of FIG. 9, showing the warning subroutine.

Referring now to FIG. 10, at step 13C, the information necessary to activate the warning means 120 is supplied to the system control microcomputer 111. Activation of the warning means 120 may include blinking of a light emitting diode (not shown) and/or display of a warning symbol within the framework of the viewfinder 201. Then at step 14C, a warning timer which is a variable stored in the memory of the microcomputer is reset. The warning timer is a variable indicative of whether or not no response is made by the operator during a period corresponding to some fields or frames subsequent to activation of the warning mens 120. At subsequent step 15C, query is made to the system control microcomputer 111 if the various buttons including the REC button 108 and so on are switched on. Then, at step 16C, the microcomputer receives from the system control microcomputer 111 the information indicative of the respective switching states of the various buttons and stores the information in a memory, followed by step 17C at which a decision is made to determine the status of the disable button 110. Where step 17C determines that the disable button 110 has been switched on, indicating that the operator has no intention to utilize the record shutoff mechanism, the program flow goes back to step 1C, but where the step 17C determines that the disable button 110 has been switched off, the program flow goes to step 18C at which decision is made to determine the status of the STOP button 109.

If at step 18C the STOP button 109 is found having been switched on, indicating that the operator has intentionally interrupted the video recording, the program flow goes back to step 1C, but if the STOP button 109 is found having been switched off, the program flow goes to step 19C at which the microcomputer acquires and stores the eye sensor information from the eye sensor 107. Then at step 20C a decision is made to determine whether or not the operator views through the viewfinder 201. If the result of decision at step 20C indicates that the operator is looking at the image through the viewfinder 201 as indicated YES, this means that the operator wishes to continue the video recording and, therefore, the program flow goes back to step 1C. On the other hand if it indicates that the operator is not looking at the image through the viewfinder 201 as indicated by NO, the program flow goes to subsequent step 21C at which the warning timer is incremented by 1.

It is to be noted that the fact that the microcomputer has proceeded from the start to step 21C means that no response was available from the operator of the video camera at that field or frame, and therefore, the count of the warning timer is incremented by 1 at step 21C as described above.

At subsequent step 22C, a decision is made to determine whether or not the count of the warning timer is smaller than a predetermined value T. If the count of the warning timer is found to be greater than the predetermined value T as indicated by NO, indicating that the erroneous or uncalled-for recording is taking place, the program flow goes to step 23C, but if the count of the warning timer is found to be smaller than the predetermined value T as indicated by YES, the program flow goes back to sep 15C so that warning can be made after lapse of a time corresponding to the next succeeding field or frame period.

The fact that the microcomputer has proceeded to step 23C means that it has been determined that the erroneous or uncalled-for video recording has taken place, and accordingly, at step 23C, information necessary to switch the REC button 108 off is supplied to the system control microcomputer 111 so that the video recording can be automatically shut off. Thereafter, the program flow returns to step 1C.

Thus, according to the third embodiment of the present invention shown in and described with reference to FIGS. 8 to 10, both of the eye sensor information and the cylinder surge information are utilized to determine the occurrence of the erroneous or uncalled-for video recording taking place. Accordingly, the video camera according to this third embodiment of the present invention is effective to eliminate the inconveniences encountered with the video camera equipped with the record shutoff mechanism disclosed in the Japanese Laid-open Patent Publication No. 3-274965 discussed hereinbefore. In other words, the video camera according to the third embodiment of the present invention is effective to eliminate the problem associated with the incapability of the video camera to make a high-angle video recording with the camera held overhead.

The video camera according to a fourth preferred embodiment of the present invention will now be described with particular reference to FIGS. 11 to 13.

Figure 11:
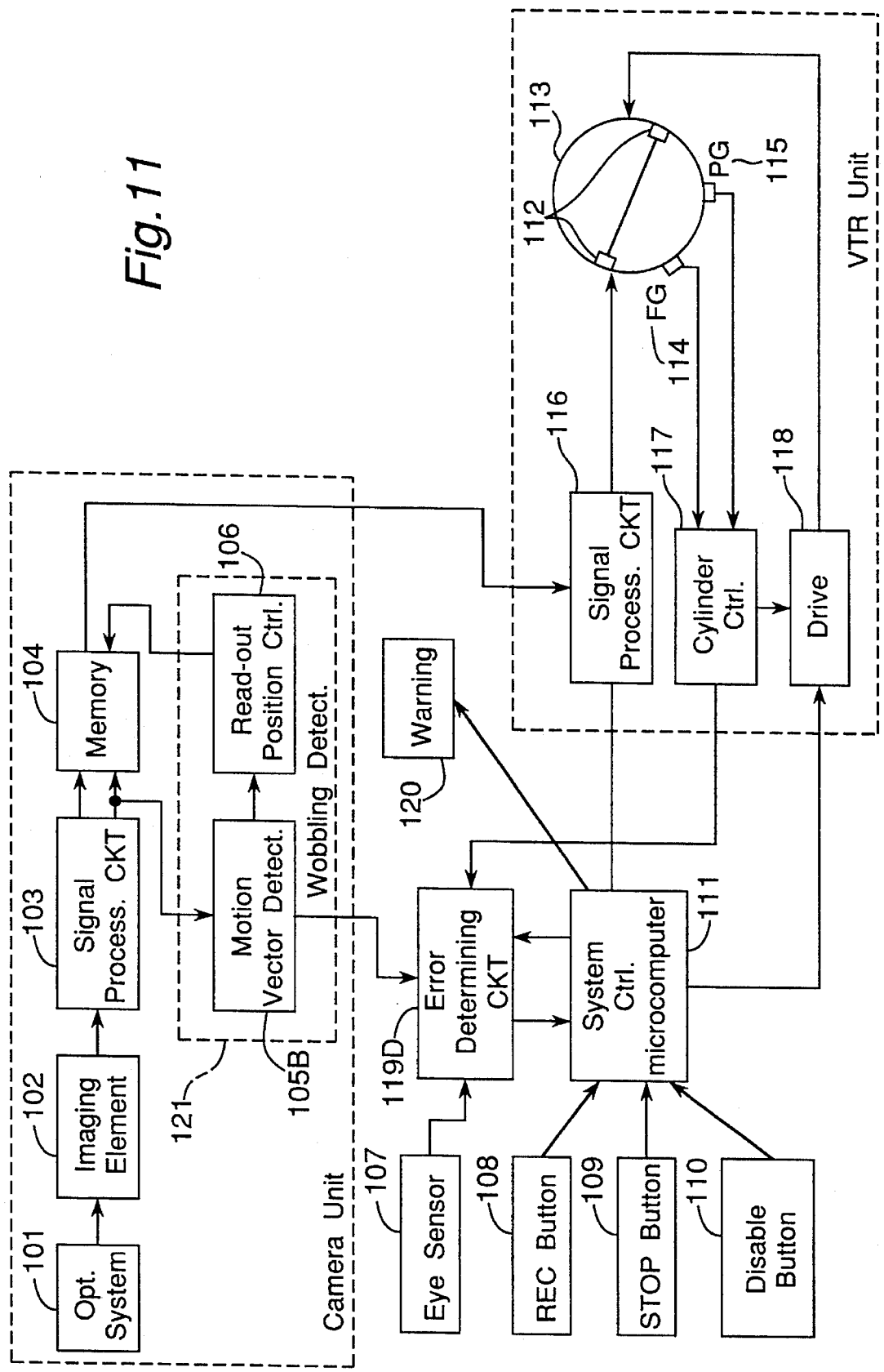
FIG. 11 is a block diagram showing an important portion of the video camera according to a fourth preferred embodiment of the present invention.

Referring first to FIG. 11, it is to be noted that component parts of FIG. 11 similar to those shown in FIG. 5 are designated by like reference numerals and only the difference between the video camera of FIG. 5 and that of FIG. 11 will be discussed. In this embodiment of FIG. 11, briefly speaking, not only is the video camera additionally provided with an eye sensor circuit 107, as is the case with the third embodiment of the present invention, for detecting whether or not the operator looks at the image through the viewfinder 201, but also the error determining circuit 119 employed in FIG. 5 is substituted by an error determining circuit 119D which utilizes the cylinder surge information supplied from the cylinder control 117, the camera wobbling information supplied from the motion vector detector 105B, and the eye sensor information supplied from the eye sensor 107 to determine whether or not the video recording then taking place is intentionally carried out by the operator.

Figure 12:
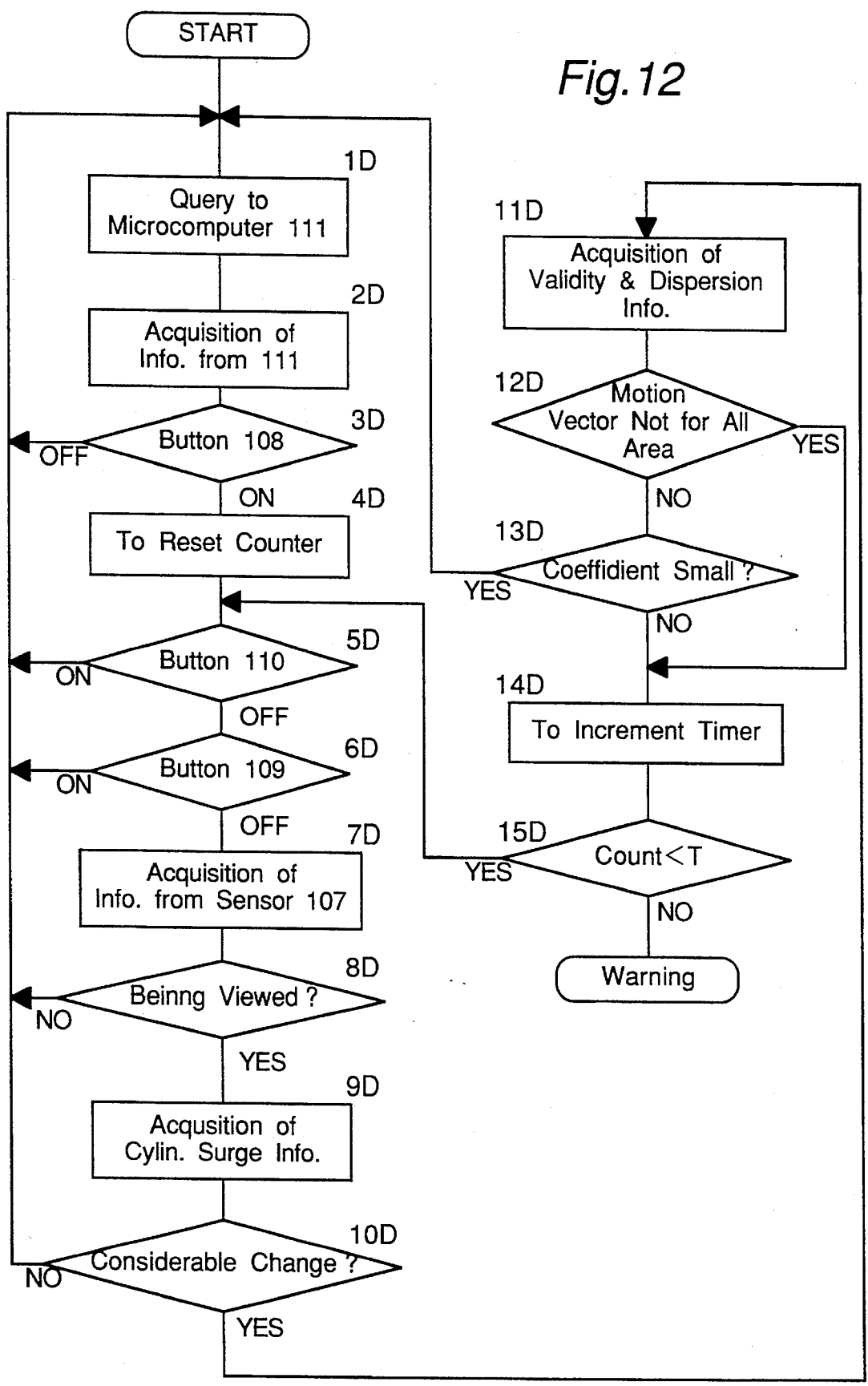
FIG. 12 is a flowchart showing the sequence of control performed by the record shutoff mechanism according to the fourth preferred embodiment of the present invention.
Figure 13:
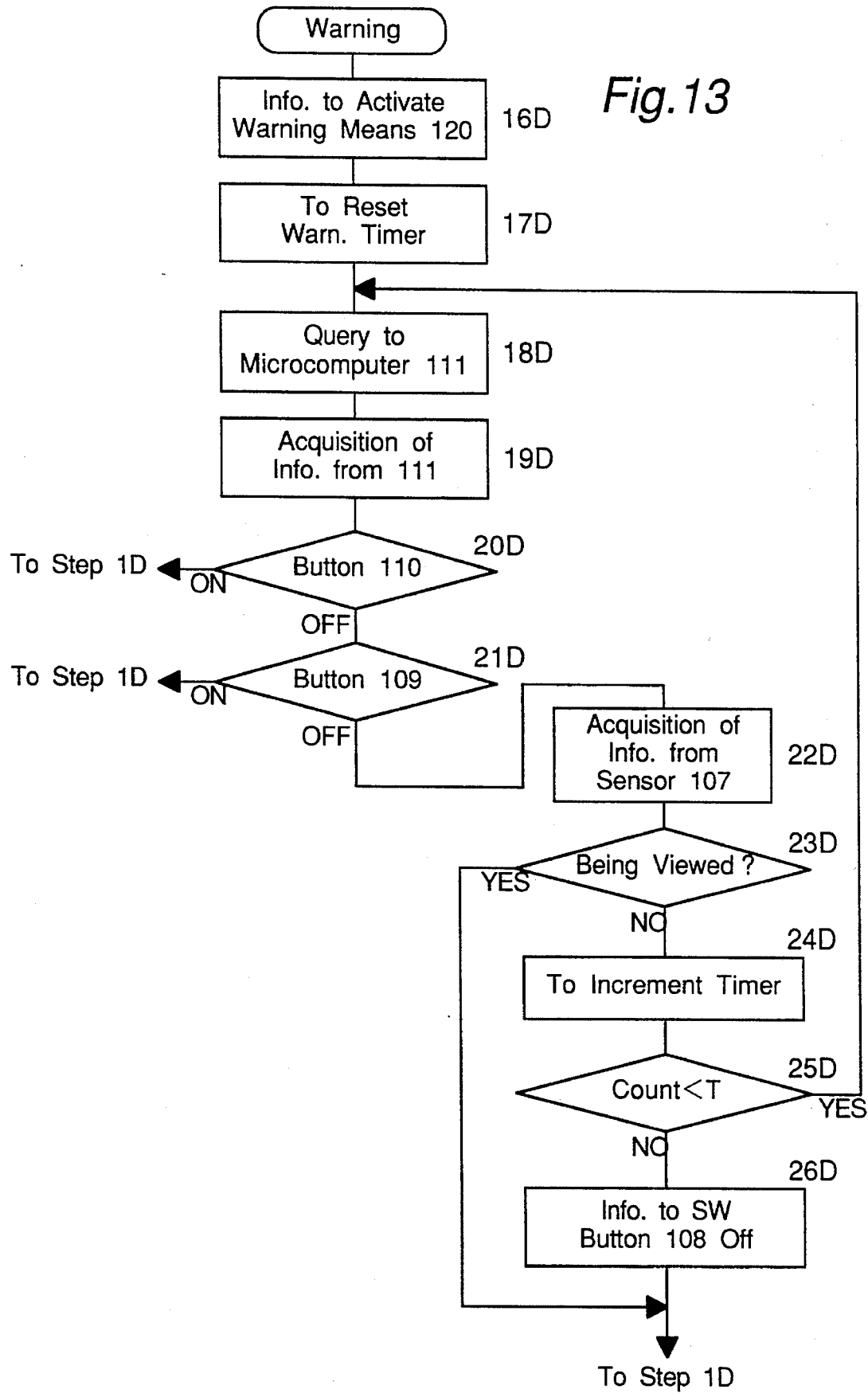
FIG. 13 is a flowchart which forms a part of the flowchart of FIG. 12, showing the warning subroutine.

The video camera according to the fourth embodiment of the present invention operates in a manner as shown in FIGS. 12 and 13, reference to which will now be made.

Subsequent to start of the program flow, and at step 1D, query is made to the system control microcomputer 111 if the various buttons including the REC button 108 and so on are switched on. At subsequent step 2D, the microcomputer receives from the system control microcomputer 111 the information indicative of the respective switching states of the various buttons and stores the information in a memory, followed by step 3D at which a decision is made to determine the status of the REC button 108. Where step 3D determines that the REC button 108 has been switched off, the program flow goes back to step 1D, but where the step 3D determines that the REC button 108 has been switched on, the program flow goes to step 4D at which a determining counter which is a variable provided in the memory of the microcomputer is reset. The determining counter represents a variable indicative of how many fields or frames a video recording takes place. At step 5D subsequent to the resetting of the determining counter, a decision is made to determine the status of the disable button 110. Should step 5D determine that the disable button 110 has been switched on, indicating that the operator of the video camera has no intention to utilize the record shutoff mechanism, the program flow goes back to step 1D, but it goes to subsequent step 6D if the disable button 110 is found having been switched off.

At step 6D, a decision is made to determine the status of the STOP button 109. If the STOP button 109 is found having been switched on, indicating that the video recording is interrupted according to the will of the operator, the program flow goes back to step 1D. However, if the STOP button 109 is found having been switched off, the program flow goes to step 7D at which the microcomputer acquires from the eye sensor 107, and then stores, eye sensor information indicative of whether the operator views through the viewfinder 201.

A decision of whether or not the operator views through the viewfinder 201 is made at subsequent step 8D. If the result of decision at step 8D indicates that the operator is looking at the image through the viewfinder 201 as indicated YES, this means that the operator wishes to continue the video recording and, therefore, the program flow goes back to step 1D. On the other hand if it indicates that the operator is not looking at the image through the viewfinder 201 as indicated by NO, the program flow goes to subsequent step 9D at which the microcomputer acquires the cylinder surge information from the cylinder control 117 and stores it in the memory.

Then at step 10D, a decision is made to determine if the cylinder surge, that is, change in rotation of the head-carrier cylinder 113, is considerable. In the event that a result of decision at step 10D indicates NO indicating that the cylinder surge is not considerable, the program flow goes back to step 1C, but in the event of the contrary (YES indicating that the cylinder surge is considerable), the program flow goes to subsequent step 11D at which the microcomputer acquires, and stores in the memory, both of the validity information and the dispersion information from the motion vector detector 105B.

Thereafter, at step 12D, a decision is made, based on the vector validity information, to determine if the motion vectors for all areas are not valid. In the event that the decision at step 12D indicates that the motion vector for at least portion of the areas is valid as indicated by NO, the program flow goes to subsequent decision step 13D, but in the event that the decision at step 12D indicates that the motion vector for all of the areas is not valid as indicated by YES, the program flow skips step 13D onto step 14D. If the decision at step 13D indicated that the motion vector coefficient is greater than the predetermined value, the program flow goes to step 14D, but if it indicates that the motion vector coefficient is smaller than the predetermined value, the program flow goes back to step 1D.

The fact that the microcomputer has proceeded from the start to step 14D means that the erroneous or uncalled-for video recording takes place at that field or frame, and therefore, the determining counter is incremented by 1 (one) at step 14D, followed by step 15D at which a decision is made to determine if the count of the determining counter is smaller than the predetermined value N. If the count of the determining counter is found to be smaller than the predetermined value N as indicated by YES, the program flow goes back to step 5D so that decision can be made to determine whether or not the erroneous recording takes place during the subsequent field or frame. On the other hand, if the count of the determining counter is found to be greater than the predetermined value N as indicated by NO, it means that the erroneous recording is taking place and, therefore, a warning subroutine shown in FIG. 13 is executed.

Referring now to FIG. 13, at step 16D, the information necessary to activate the warning means 120 is supplied to the system control microcomputer 111. Activation of the warning means 120 is represented by blinking of a light emitting diode (not shown) and/or display of a warning symbol within the framework of the viewfinder 201. Then at step 17D, a warning timer which is a variable stored in the memory of the microcomputer is reset. The warning timer is a variable indicative of whether or not no response is made by the operator during a period corresponding to some fields or frames subsequent to activation of the warning mens 120. At subsequent step 18D, query is made to the system control microcomputer 111 if the various buttons including the REC button 108 and so on are switched on. Then, at step 19D, the microcomputer receives from the system control microcomputer 111 the information indicative of the respective switching states of the various buttons and stores the information in a memory, followed by step 20D at which a decision is made to determine the status of the disable button 110.

Where step 20D determines that the disable button 110 been switched on, indicating that the operator has no intention to utilize the record shutoff mechanism, the program flow goes back to step 1D, but where the step 20D determines that the disable button 110 has been switched off, the program flow goes to step 21D at which decision is made to determine the status of the STOP button 109. If at step 21D the STOP button 109 is found having been switched on, indicating that the operator has intentionally interrupted the video recording, the program flow goes back to step 1D, but if the STOP button 109 is found having been switched off, the program flow goes to step 22D at which the microcomputer acquires from the eye sensor 107, and then stores, eye sensor information indicative of whether the operator views through the viewfinder 201.

A decision of whether or not the operator views through the viewfinder 201 is made at subsequent step 23D. If the result of decision at step 23D indicates that the operator is looking at the image through the viewfinder 201 as indicated YES, this means that the operator wishes to continue the video recording and, therefore, the program flow goes back to step 1D. On the other hand if it indicates that the operator is not looking at the image through the viewfinder 201 as indicated by NO, the program flow goes to subsequent step 24D at which the warning timer is incremented by 1.

It is to be noted that the fact that the microcomputer has proceeded from the start to step 24D means that no response was available from the operator of the video camera at that field or frame, and therefore, the count of the warning timer is incremented by 1 at step 24D as described above.

At subsequent step 25D, a decision is made to determine whether or not the count of the warning timer is smaller than a predetermined value T. If the count of the warning timer is found to be greater than the predetermined value T as indicated by NO, indicating that the erroneous or uncalled-for recording is taking place, the program flow goes to step 26D, but if the count of the warning timer is found to be smaller than the predetermined value T as indicated by YES, the program flow goes back to sep 18D so that warning can be made after lapse of a time corresponding to the next succeeding field or frame period.

The fact that the microcomputer has proceeded to step 26D means that it has been determined that the erroneous or uncalled-for video recording has taken place, and accordingly, at step 26D, information necessary to switch the REC button 108 off is supplied to the system control microcomputer 111 so that the video recording can be automatically shut off. Thereafter, the program flow returns to step 1D.

Thus, according to the fourth preferred embodiment of the present invention, the video camera is very convenient to handle because the nature of the video recording then taking place, that is, whether or not the video recording taking place is carried out as desired by the operator, is determined by the utilization of not only the eye sensor information furnished by the eye sensor 107, but also both of the cylinder surge information and the information on the validity of the motion vectors and the motion vector coefficient representative of the degree of dispersion.

Although the present invention has been described in connection with the preferred embodiments thereof with reference to the accompanying drawings, it is to be noted that various changes and modifications are apparent to those skilled in the art. For example, although in FIG. 3 the cylinder surge information provided by the error determining means 119, 119B, 119C or 119D has been employed in the form of the output from the adder circuit 306, the cylinder surge information may be represented by either one of the output from the speed control circuit 302 and the phase control circuit 305, or any other electric signal provided that the latter is indicative of change in rotation of the head-carrier cylinder 113.

Also, although reference has been made to the utilization of the cylinder surge information, information indicative of change in rotation of a capstan used in the video camera to transport the length of magnetic recording tape past the head-carrier cylinder may be equally employed. In such case, a capstan control may be of a circuit design similar to that of the cylinder control 117 best shown in FIG. 3, provided that the frequency and pulse generator 114 and 115 and the drive circuit 118 are modified to be operatively associated with the capstan.

Each of the error determining circuits 119, 119B, 119C and 119D employed in the various embodiments of the present invention can be implemented by the software program and may therefore be implemented by the system control microcomputer 111.

Figure 6:
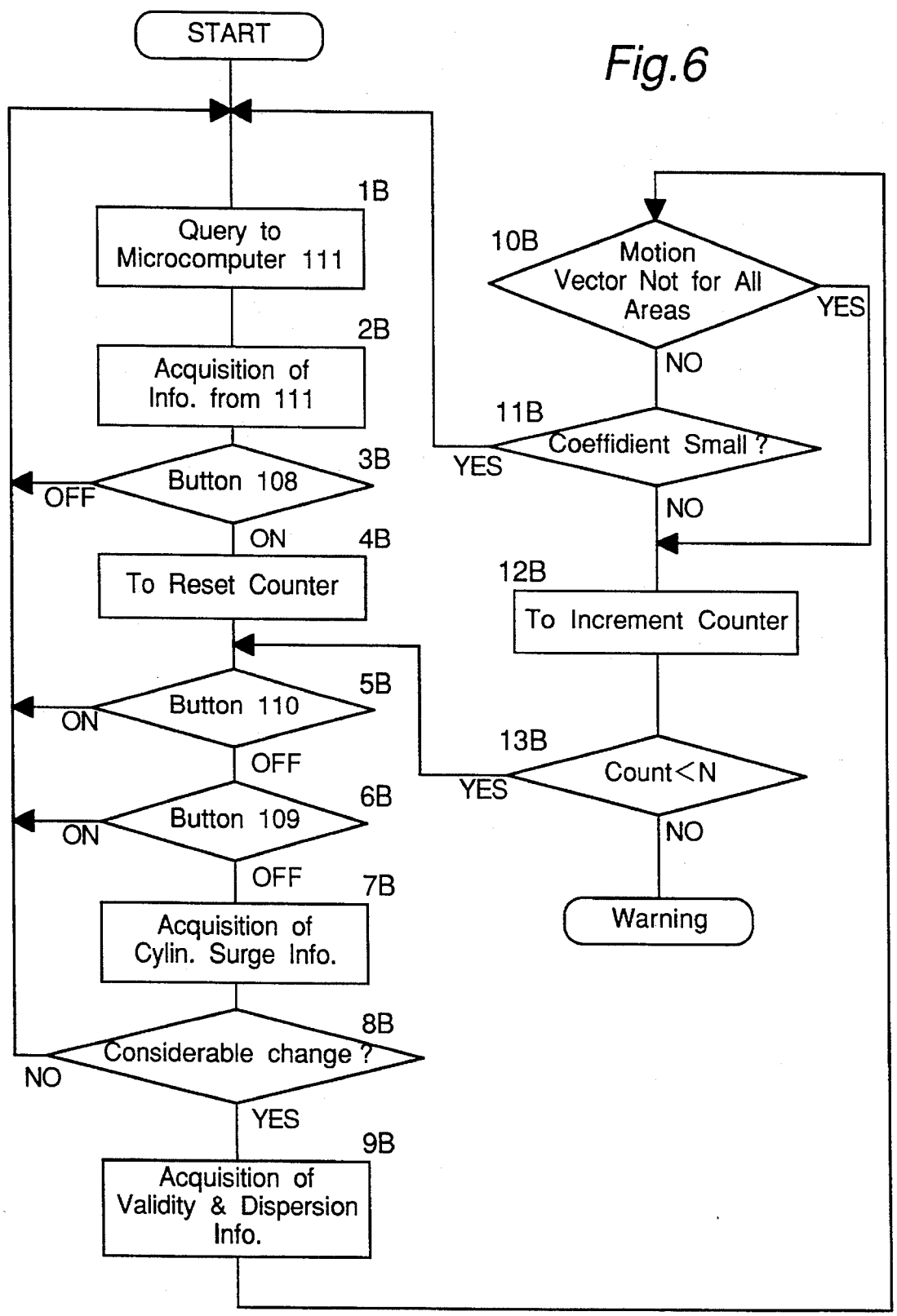
FIG. 6 is a flowchart showing the sequence of control performed by the record shutoff mechanism according to the second preferred embodiment of the present invention.

In describing the operation of the error determining circuit 119B or 119D employed in each of the second and fourth embodiments of the present invention, it has been described that determination based on the cylinder surge information is followed by determination based on the motion vector information as shown in FIG. 6 or 12. However, the sequence of determination done by the error determining circuit 119B or 119D may be reversed with respect to that shown in FIG. 6 or 12.

Also in describing the operation of the video camera according to the second embodiment of the present invention shown in FIG. 6, it has been described that if the decision at step 8B indicates that the change in rotation of the head-carrier cylinder 113 is considerable and not considerable, the program flow goes to step 9B and step 1B, respectively. However, it may be modified so that if the decision at step 8B indicates that the change in rotation of the head-carrier cylinder 113 is considerable and not considerable, the program flow goes to step 12B and step 9B, respectively.

So far as the third embodiment of the present invention is concerned, the error determining circuit 119C has been shown as operable on a logic AND condition in which determination based on the eye sensor is followed by determination based on the cylinder surge information. However, it may be modified to operate on a logic OR condition in which no priority is given to the sequence of determination based on the eye sensor and that on the cylinder surge information.

Similarly, although in the practice of the third embodiment of the present invention, the error determining circuit 119D has been shown as operable on a logic AND condition in which determination based on the eye sensor is followed by determination based on the cylinder surge information which is in turn followed by determination based on the motion vector information, it may be modified to operate in such a manner that, after the sequence of determination based on the cylinder surge information followed by that on the motion vector information, determination based on the eye sensor information is carried our depending on a logic OR condition between a result of either the determination based on the cylinder surge information or that on the motion vector information.

Finally, the use of the camera wobbling detecting unit 121 in any one of the first and third embodiments of the present invention is not always essential and may therefore be dispensed with if desired.

Accordingly, such changes and modifications are to be understood as included within the scope of the present invention as defined by the appended claims, unless they depart therefrom.

What is claimed is:

1. A video camera which comprises:

an image taking means including an image taking optical system for providing an optical image of an object to be videoed and an imaging element for converting the optical image into an electric video signal which is subsequently outputted from such image taking means;

an information recording means including a rotary element driven at a controlled speed during operation of the video camera and for recording the electric video signal on a recording medium;

a rotation surge detecting means for detecting a change in rotation of the rotary element and for outputting a surge signal indicative of the change in rotation of the rotary element;

an error determining means for determining a frequency of occurrence per unit time of a first condition in which the change in rotation of the rotary element exceeds a first predetermined value and for detecting a second condition in which the frequency of occurrence exceeds a second predetermined value to thereby determine an occurrence of an unintended recording of the electric video signal on the recording medium;

a warning means operable in response to an output from the error determining means for issuing a warning signal indicative of the occurrence of the unintended recording to an operator of the video camera; and a control means for controlling the imaging taking means and the information recording means to halt the unintended recording of the electric video signal on the recording medium in the event that the warning signal is ignored by the operator for a predetermined length of time subsequent to the issue of the warning signal.

2. The video camera as claimed in claim 1, wherein said rotary element is a rotatably supported head-carrier cylinder and wherein said rotation surge detecting means is operable to detect the change in rotation of the head-carrier cylinder.

3. The video camera as claimed in claim 1, wherein said rotary element is a motor-driven capstan for driving the recording medium and wherein said rotation surge detecting means is operable to detect the change in rotation of the capstan.

4. The video camera as claimed in claim 1, wherein said rotary element includes a rotatably supported head-carrier cylinder and a motor-driven capstan for driving the recording means and wherein said rotation surge detecting means is constituted by at least one of a first rotation surge detecting means for detecting the change in rotation of the cylinder and a second rotation surge detecting means for detecting the change in rotation of the capstan.

5. The video camera as claimed in claim 1, wherein said rotation surge detecting means is for detecting, as said change in rotation of the rotary element, a speed difference between an actual rotational speed of the rotary element and the controlled speed.

6. The video camera as claimed in claim 2, wherein said rotation surge detecting means is for detecting, as said change in rotation of the rotary element, a speed difference between an actual rotational speed of the rotary element and the controlled speed.

7. The video camera as claimed in claim 3, wherein said rotation surge detecting means is for detecting, as said change in rotation of the rotary element, a speed difference between an actual rotational speed of the rotary element and the controlled speed.

8. The video camera as claimed in claim 4, wherein said rotation surge detecting means is for detecting, as said change in rotation of the rotary element, a speed difference between an actual rotational speed of the rotary element and the controlled speed.

9. The video camera as claimed in claim 1, wherein said rotation surge detecting means is for detecting, as said change in rotation of the rotary element, a phase difference between a signal indicative of a position of the rotary element and a reference signal.

10. The video camera as claimed in claim 2, wherein said rotation surge detecting means is for detecting, as said change in rotation of the rotary element, a phase difference between a signal indicative of a position of the rotary element and a reference signal.

11. The video camera as claimed in claim 3, wherein said rotation surge detecting means is for detecting, as said change in rotation of the rotary element, a phase difference between a signal indicative of a position of the rotary element and a reference signal.

12. The video camera as claimed in claim 4, wherein said rotation surge detecting means is for detecting, as said change in rotation of the rotary element, a phase difference between a signal indicative of a position of the rotary element and a reference signal.

13. The video camera as claimed in claim 1, wherein said rotation surge detecting means is for detecting, as said change in rotation of the rotary element, a difference between a speed difference of the rotary element and a phase difference of the rotary element, the speed difference being a difference between an actual rotational speed of the rotary element and the controlled speed, and the phase difference being a difference between a signal indicative of a position of the rotary element and a reference signal.

14. The video camera as claimed in claim 2, wherein said rotation surge detecting means is for detecting, as said change in rotation of the rotary element, a difference between a speed difference of the rotary element and a phase difference of the rotary element, the speed difference being a difference between an actual rotational speed of the rotary element and the controlled speed, and the phase difference being a difference between a signal indicative of a position of the rotary element and a reference signal.

15. The video camera as claimed in claim 3, wherein said rotation surge detecting means is for detecting, as said change in rotation of the rotary element, a difference between a speed difference of the rotary element and a phase difference of the rotary element, the speed difference being a difference between an actual rotational speed of the rotary element and the controlled speed, and the phase difference being a difference between a signal indicative of a position of the rotary element and a reference signal.

16. The video camera as claimed in claim 4, wherein said rotation surge detecting means is for detecting, as said change in rotation of the rotary element, a difference between a speed difference of the rotary element and a phase difference of the rotary element, the speed difference being a difference between an actual rotational speed of the rotary element and the controlled speed, and the phase difference being a difference between a signal indicative of a position of the rotary element and a reference signal.

* * * * *